Sept. 16, 1969     B. NYSTEN     3,466,714
SNAP FASTENER ASSEMBLY
Filed Jan. 25, 1966     3 Sheets-Sheet 2
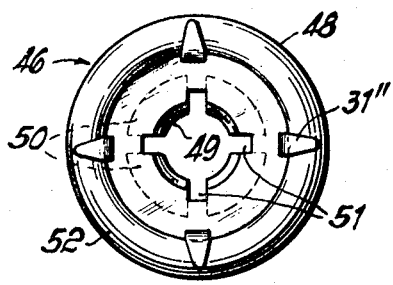
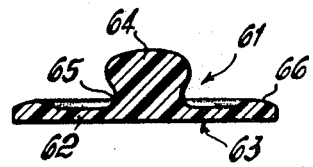
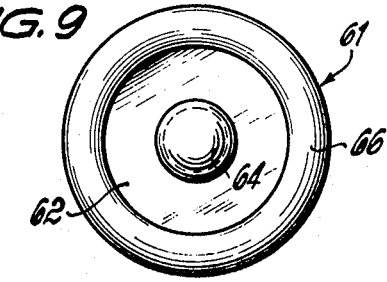
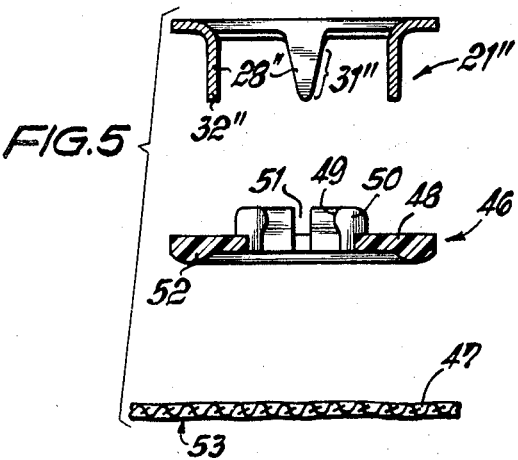
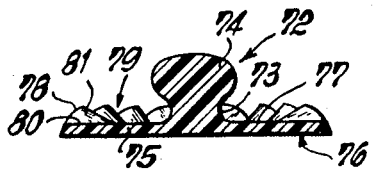
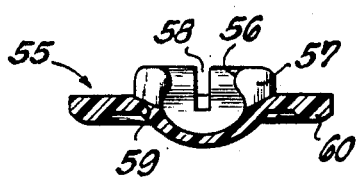
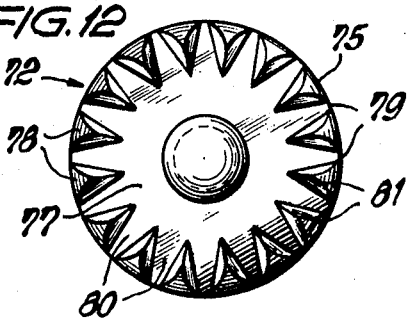
INVENTOR
Bernhard Nysten
by
Michael J. Striker
ATTY United States Patent Office 3,466,714
Patented Sept. 16, 1969

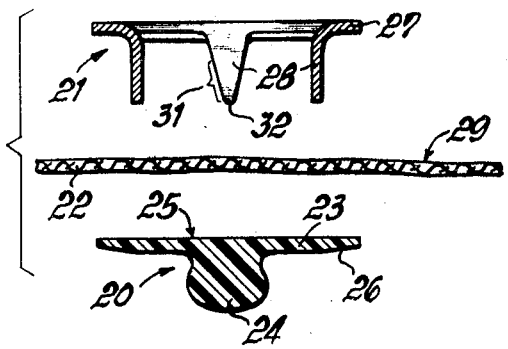
FIG. 1
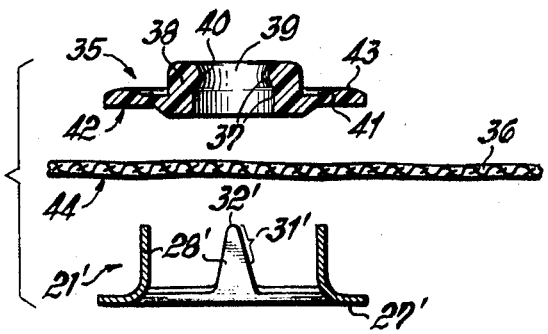
FIG. 2
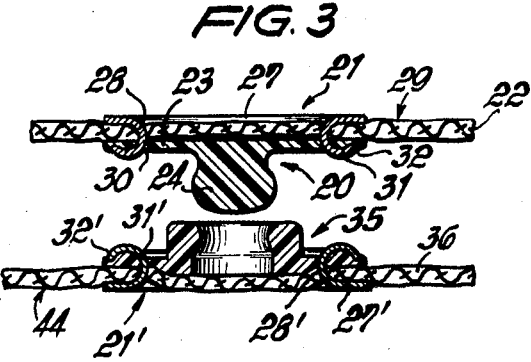
FIG. 3
FIG. 4

3,466,714
SNAP FASTENER ASSEMBLY
Bernhard Nysten, Aachen, Germany, assignor to William Prym-Werke KG., Stolberg, Rhineland, Germany
Filed Jan. 25, 1966, Ser. No. 522,974
Claims priority, application Germany, Feb. 17, 1965, P 36,092
Int. Cl. C44b 17/00
U.S. Cl. 24—208    7 Claims

ABSTRACT OF THE DISCLOSURE

A snap fastener assembly comprises an annular first component which is provided with a plurality of relatively rigid projections extending from one side thereof. A second component is made at least partially from a material penetrable by the projections of the first component and the latter is located at one side of the second component. The one side of the second component is provided with at least one annular projection having an outer diameter which corresponds to the diameter of the aperture in the annular first component, and at least a portion of each of the projections extends through the penetrable material of the second component and beyond the other side thereof.

---

The present invention relates to a coupling. More specifically, the present invention relates to a coupling whose coupling elements may be connected to a carrier. Still more specifically my present invention relates to a coupling which may be employed with particular advantage in a snap fastener.

In snap fasteners an important consideration is that the fastener should be as universally usable as possible, to reduce the number of different types and sizes required for the various applications, where size requirements and retaining and separating forces often differ sharply from one application to the next.

Various types of snap fasteners are known in the art which attempt to accommodate a wide range of applications and requirements. One well-known type is made of plastic material and suitably secured to a textile or other carrier, and the force necessary for connecting and disconnecting its male and female sections is regulatable by simply making the fastener from different plastic materials, that is, by using one material for one application and another for some other application. However, these plastic fasteners are difficult to secure to the respective carrier since they must be either sewn on or be welded thereto. Other fastener types utilize two portions for each of the male and female sections, one of these portions having a hollowed stem or head, and the other portion having a complementary projection which passes from one side of the carrier through an opening therein to the other side, and into the stem of the first portion where it is frictionally retained. This construction suffers from the disadvantage that frequently the carrier will tear, having been weakened by the relatively large opening which must be provided for passage of the projection therethrough. Also, the carrier frequently forms undesirable wrinkles in the region through which the projection passes, since it is economically not feasible to pre-cut the necessary opening, which latter is provided by pushing the projection through the material of the carrier.

There are further known fasteners, generally made of metal, which again comprise two portions for each of the male and female sections, one of these portions being an annulus with a plurality of teeth which are pressed through the material of the carrier and into the receiving portion of the respective section whereupon they are bent over to prevent separation. This has the advantage that the carrier material is ruptured only to a relatively minor extent, so that the formation of rips is less likely. The disadvantage of this particular construction lies in the fact that the receiving portion of the respective section must be provided with openings corresponding to the teeth of the annulus, and that the annulus must be so positioned that each of the teeth will register with corresponding openings. This is difficult to do and rather uneconomical. In another construction of this general type, the receiving portion is provided with a circumferential bulge and the teeth on the annulus are so arranged that they will penetrate the material radially outwardly of this bulge, whereupon they are then bent downwardly and radially inwardly over the bulge.

The main disadvantage of these latter constructions lies in the fact that different fastening portions, which are the annuli with the teeth thereon, must be provided if the size of the actual male or female section, that is the respective portion which cooperates with the fastening portion, is to vary beyond very restricted limits. In other words, if the other portion is to be doubled in size, then the usual annulus carrying the teeth cannot be used and a larger annulus must be provided. All this is uneconomical.

It is therefore a general object of the present invention to overcome the drawbacks of snap fasteners known to the art.

A more specific object of the present invention is to provide a coupling, particularly for cooperating male and female sections of a snap fastener, which will connect such sections to a textile or like carrier.

Another object of the invention is to provide such a coupling in which one component of each section is secured to one side of a carrier by means of another component of the same section which is disposed on the other side of the carrier and provided with teeth which penetrate the carrier, and whose teeth engage the one component for securing the two components together and to the carrier.

Still a further object of the invention is to provide a coupling of the type described above in which proper connection of the two components of each section is assured, even if one of the components is rotated with reference to the other prior to connecting of the two.

A concomitant object of the invention is to provide a coupling of the type described which permits the use of a single standardized fastening component, e.g., an annulus provided with teeth, in snap fasteners of varying sizes.

Yet an additional object of the invention is to provide a coupling of the type described which is simple and economical to manufacture, and easy to assemble.

In accordance with one feature of the invention I provide a coupling, particularly a coupling suitable for connecting cooperating male and female sections of a snap fastener to a textile or like carrier. Such coupling may comprise a first component which has a plurality of relatively rigid projections extending from one side thereof, and a second component which is made at least partially from a material penetratable by the projections. The first component will be located at one side of the second component and at least a portion of each of the projections will extend through the penetrable material of the second component and beyond the other side thereof, so that each of these portions at least some of which may be suitably deformed after penetration, will constitute an anchor preventing separation of the first and the second components.

The invention itself, both as to its construction and its method of operation, together with additional objects and advantages thereof, will be best understood from the following description of specific embodiments when read in connection with the accompanying drawings, in which:

FIG. 1 is an exploded view of the two components of a male snap-fastener section prior to connection of these two components to a carrier;

FIG. 2 is a view similar to FIG. 1, but showing the two components of a female section of a snap-fastener;

FIG. 3 is a sectional elevation of the embodiment shown in FIG. 1 after securing of the components to the carrier;

FIG. 4 is a view similar to FIG. 3, but showing the components of FIG. 2 after securing to the carrier;

FIG. 5 is a view similar to FIG. 2, but showing a modified embodiment of the two components of a female snap-fastener section;

FIG. 6 is a bottom view of the components shown in FIG. 5, with the carrier omitted for clarity;

FIG. 7 is a sectional elevation of a further embodiment of a female snap-fastener section;

FIG. 8 is a sectional elevation of another embodiment of a male section of a snap fastener;

FIG. 9 is a top-plan view of the embodiment shown in FIG. 8;

FIG. 11 is yet another embodiment of a male snap fastener section, shown in a view similar to FIG. 10;

FIG. 12 is a top plan view of the embodiment shown in FIG. 11;

Figure 10:
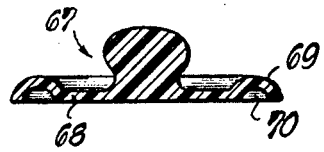
FIG. 10 is a further embodiment of a male section of a snap fastener, shown in sectional elevation.

Discussing now the drawings in detail, and first FIG. 1 thereof, it will be seen that there is shown a male snap fastener section comprising one component 20, namely the component carrying the male coupling member, and another component 21, namely the component which serves to secure the one component to the carrier and which will henceforth be called the "securing component," and a carrier 22 to which the two components are to be secured. The component 20 comprises a plate-like portion 23 which in the connected condition of the male section will overlie the carrier 22, and a substantially ball-shaped projection 24 which is arranged centrally on the portion 23. The latter is flat on its side which is to be juxtaposed with the carrier, and on the side facing the projection 24 it tapers towards the outer edge 26. The component 20 is made of a penetratable plastic material, such as polyamide.

The other component, that is the securing component, is constructed as an annulus 21 comprising a flat annular portion 27 on which there are arranged four or more teeth or projections 28. In the embodiment of FIG. 1, only three of these teeth are visible. These teeth 28 penetrate the carrier on the side thereof opposite the component 20 and, after completing such penetration, further penetrate the plate-like member 23 of component 20 at any point, such as at 30 (FIG. 3). Those portions 31 of the teeth 28 which project beyond the plate-like portion 23 are then bent over towards the peripheral edge of the portion 23, and their tips 32 are pressed into the material of the portion 23, as shown in FIG. 3.

FIG. 2 shows a female snap fastener section corresponding substantially to the male section shown in FIG. 1 and suitable for use therewith. The component carrying the female portion or socket is designated with reference numeral 35 and the securing component is designated with reference numeral 21'. The carrier to which the two are to be secured is identified with reference numeral 36. The securing component 21' being the same as the securing component 21 of FIG. 1, it need not be further described and all its portions are identified with the same reference numerals as are used in FIG. 1.

As far as the female portion of the female section shown in FIG. 2 is concerned, it will be seen that the sleeve-like portion 38 thereof is provided with engaging portions 37 which will retain the projection 24 of the male section when the same is received in the sleeve 38. To permit such introduction the sleeve 38 is provided with an opening 39 which has an inwardly extending peripheral projection 40 so that the male projection 24 of the male fastener section will be securely retained in the sleeve 38. The sleeve 38 is surrounded by a ring-shaped portion 41 which is arranged slightly upwards of the lower portion of the sleeve 38, so that a step 42 is created on the side of ring 41 which faces away from the carrier 36. As a result of this step formation the ring 41 is peripherally surrounded by an annular second portion 43.

FIG. 3 shows the male and female snap fastener sections of FIGS. 1 and 2 in position for engagement with one another.

As shown in FIG. 4, the two components of FIG. 2 are secured together in a manner similar to that of FIG. 1. The teeth 28' of the annular securing component 21' penetrate the carrier 36 from the side 44 thereof, and subsequently penetrate the plastic material of the ring-shaped member 41 at any point of a circle which is concentric with the axis of the female component 35 and whose diameter corresponds to the diameter of the annulus 21' as measured between the teeth 28'. The projecting ends 31' of the teeth 28' are bent downwardly into the peripheral bulge 43 and pressed into the plastic material of the bulge 43 to a degree sufficient to embed their tips 32'. It will be seen that upon connection of the two components of the female snap fastener section the portion 27' of the annulus 21' is received in the step 42 of the member 41, together with the intermediate portion of the carrier 36, so that the portion 27' does not project beyond the lower side 44 of the carrier 36. The sleeve 38 is open so that the carrier is visible through the opening 39.

A further embodiment of a female section is shown in FIGS. 5 and 6 and it will be seen that the annular connecting member is designated with reference numeral 21'', and the carrier with reference numeral 47. In this embodiment, that portion of the female member 46 which is to overlie the carrier 47 is constructed as an annulus 48 arranged at the base of the sleeve-like member 50 which is provided with engaging surfaces 49 for the male projection of the male snap fastener section. This embodiment differs from that of FIG. 2 mainly in that slots 51 are provided at several points (four shown) of the engaging surfaces 49, so as to permit a more ready elastic deformation of the sleeve 50 during insertion of the male member. At its peripheral edge the annulus 48 is provided with a bulge 52 which is arranged on the underside of the annulus 48 and thus faces the carrier 47.

The annular securing component is designated with reference numeral 21'' and is similar to those shown in FIGS. 1 and 2. It will be seen that the connection of this construction to the carrier is different, however. Both components of this section are secured to the carrier 47 from one side thereof, not from opposite sides. This is accomplished in that the teeth 28'' of the securing component 21'' first penetrate the member 46 and then the carrier 47 whereafter, as shown in FIG. 6, where the carrier is omitted for the sake of clarity, they are bent over into engagement with the bulge 52. The points 32'' of the teeth 28" are pressed into the material of the annulus 48 as deeply as possible.

In FIG. 7 there is shown a sectional view of a further embodiment of a female member 55 which is secured to a carrier by means of an annular securing component of the already described type and in the manner discussed with reference to the preceding embodiment. Here again the sleeve 57 of the member 55, which is provided with the engaging surfaces 56, is provided with slots 58, while the portion 59, which is to overlie the carrier, is imperforate and of plate-shaped configuration. The sleeve 57 is thus closed at its end which faces the carrier. The other side of the plate 59 is provided with a peripheral bulge 60 which faces the carrier when the member 55 is secured thereto.

FIG. 8 illustrates another embodiment of a male member 61 in a sectional elevation. This member 61 comprises a plate 62 which overlies with its flat lower side 63 a carrier (not shown). On its other side the plate 62 is provided with a centrally arranged ball-shaped projection 64 provided with engaging surfaces 65. Peripherally, this other side of the plate 62 is provided with a bulge 66 over and into contact with which the teeth of a securing component are bent, in the manner described with reference to the embodiments shown in FIGS. 2 and 4.

FIG. 9 is a top plan view of the embodiment shown in FIG. 8 and needs no further comment.

An embodiment of a male member, somewhat similar to that in FIG. 8, is shown in FIG. 10. The member is there designated with reference numeral 67 and the difference between this embodiment and the one of FIG. 8 consists in that the peripheral bulge 69, which is provided on a plate 68, is provided with an annular recess 70 on that side which faces the carrier. This makes the material of the bulge 69 more easily deformable under pressure, so that the teeth of a cooperating securing component can be pressed into the material of bulge 69 more readily.

FIGS. 11 and 12 show another embodiment of a male member, here designated with a numeral 72. As is clearly evident from FIG. 11, the shape of the projection 74, which is provided with engaging surfaces 73, is similar to that of the projection in FIG. 10. Projection 74 is carried by a plate 75 which overlies with its flat underside 76 the carrier (not shown). Again, the member 72 will be secured to the carrier by means of a toothed securing component which has been described hereinbefore and thus need not be discussed again. It is merely necessary to point out that, as the teeth penetrate the carrier and the plate 75, the projecting tips of the teeth are bent over at the upper side 77 of the plate 75. A peripheral bulge 78 at the upper side 77 of plate 75 is provided with a plurality of radially extending depressions 79 which are arranged closely side by side, so that the projecting tips will each be received in a corresponding depression 79. At their respective bases 80 these depressions 79 are so configurated that they correspond to the shape of the teeth. The side walls 81, which together with the respective base 80 define the depressions 79, are inclined with respect to each other so that, if a projecting tip of a tooth is not exactly arranged in correspondence with one of the depressions 79 upon penetrating the plate 75, bending-over the tip will cause the same to be guided into proper position within one of the depressions 79 by engagement with the inclined side walls 81.

Figure 13:
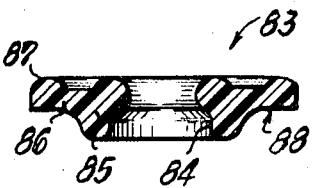
FIG. 13 is a section through a component of a female section of a snap fastener in a further embodiment.

Another embodiment of a female member 83 is shown in FIG. 13 and it will be seen that the sleeve-like portion 85, which is provided with engaging surfaces 84, is somewhat similar to that of the embodiment shown in FIG. 2. The portion of member 83 which is to overlie the carrier is constructed as an annulus 86 which surrounds the sleeve 85 circumferentially. In accordance with a feature of the invention this annulus is arranged at the upper end of the sleeve 85 and is provided with a peripheral bulge 87 which is arranged on that side of the annulus 86 which faces away from the carrier to which the member 83 is to be secured. The top of this bulge 87 extends in a common transverse plane with the end face of the sleeve 85, and intermediate this end face and the bulge 87 there is provided a relatively deep annular depression or step 88 in which the securing component will be received together with the carrier, the latter being disposed between the securing component and the member 83.

Figure 14:
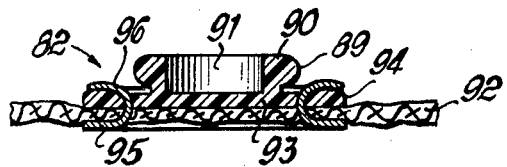
FIG. 14 is a section taken through a male section of the snap fastener in a further embodiment.

Turning now to FIG. 14 it will be seen that there is shown therein a male member 82 secured to a carrier 92. This male member 82 is provided with particularly large engaging surfaces 89 on its projecting portion 90. The projecting portion or head 90 is provided with a central recess 91 and the portion of the member 89 which will engage the carrier is constructed and shaped as a plate 93 and closes off the recess 91 from the carrier 92. The plate 93 is provided with a peripheral bulge 94 which is arranged on that side of the plate 93 which faces away from the carrier 92. A securing component 95, which has been described with reference to the preceding embodiments, is used to secure the member 82 to the carrier 92 by having the teeth 96 of the component 95 penetrate first the carrier 92 from one side thereof, and then the plate 93 of the member 82 which is arranged on the other side of the carrier 92.

Figure 15:
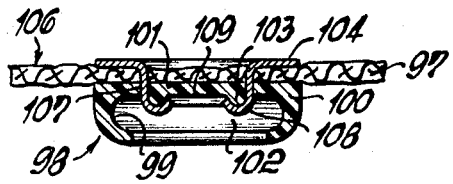
FIG. 15 is a section taken through a female section of a snap fastener cooperating with the male section shown in FIG. 14.

FIG. 15 represents a section taken through a female fastener section 98 which is secured to a carrier 97 and whose socket or sleeve 100 is provided with particularly large engaging surfaces 99 in correspondence with the similar feature of the male snap fastener shown in FIG. 14. That part 101 of the member 98 which engages the carrier 97 is of plate-like construction and closes the recess 102 provided in the socket at one end so that the recess is not open to the carrier 97. In the interior of the recess 102 there is provided an annular bulge 103 on that side of the plate 101 which faces the interior of the recess 102. This bulge 103 is concentric with the axis of the socket 100 and the projecting teeth of a securing component 102 will, after penetrating through the carrier 97 and the plate 100, be bent over the annular bulge 103. It will be seen that the teeth 105 of the securing component 102 first penetrate the carrier 97 from the reverse side 106 thereof, and then penetrate the plate 101 at the outer periphery 107 of the bulge 103. The projecting tips 108 of the teeth 105 are bent radially inwardly toward the axis 109 of the member 98. It will be clear from the drawing that in this embodiment the securing component may have a diameter, as measured between diametrically opposite teeth, which can be much smaller than that of the sleeve 100. In fact, and particularly if the thickening 103 is eliminated, the size of the securing component is limited in its upper and lower ranges only by the consideration that the teeth must penetrate the plate 101 within the recess 102 of the socket.

Figure 16:
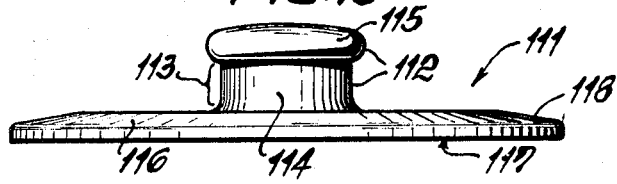
FIG. 16 is a side-elevational view of a modified embodiment of a male snap fastener section.

Turning to FIG. 16, there is shown there a male member 111 which is provided with a projection 113 having engaging surfaces 112. The projection 113 comprises a cylindrical portion 114 with a head 115 at its free end. At its other end the portion 114 merges into a plate 117 whose lower side is flat and overlies the carrier. The upper side of the plate 116 tapers in radially outward direction and there is provided a tapering peripheral edge portion 118 against which the bent-over tips of the teeth of the cooperating securing component will abut.

Figure 17:
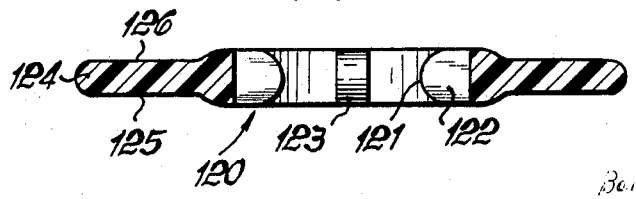
FIG. 17 is a section through yet another modified female section adapted to cooperate with the male section shown in FIG 16.

Coming, finally, to FIG. 17, it will be seen that the female member 120 shown there is suitable for use with the male member of FIG. 16. The female member 120 in FIG. 17 comprises an annular socket 122 of very flat configuration and provided with engaging surfaces 121. To facilitate elastic deformation of the socket 122 upon closure and opening of the snap fastener, the engaging surfaces 121 are provided with slots 123. It will be evident that if the female member 120 of FIG. 17 is used in conjunction with the male member 111 of FIG. 16, the engaging surfaces 121 of the female member 120 will engage the cylindrical portion 114 of the male member 111. Arranged intermediate the top and bottom faces of the socket 123 is a further annular portion 124 which overlies the carrier. Since this portion 124 is of identical configuration on both sides, it is immaterial which of the sides is placed against the carrier. Since the portion 124 is arranged downwardly spaced from both opposite end faces of the socket 122, there is provided a recess or step on both sides, respectively indicated by reference numerals 125 and 126, and either recess will serve to receive a securing component when the teeth of the latter penetrate the material of member 120. It should be noted that in this particular embodiment it is possible to have the teeth of the securing component first penetrate the carrier and the portion 124 of member 120, or alternately to have the teeth of the securing component first penetrate portion 124 of member 120 and only thereafter the carrier.

Of course it will be understood that the present invention is capable of being modified in many ways and that the embodiments shown herein are for purposes of illustration only. The engaging surfaces provided both on the male and female sections can be of various different configurations, the bulges can be of different shapes and various ones of such bulges and also of depressions for receiving the projecting tips of the teeth of the securing components can be provided on one and the same member. This would then permit use of securing components of different sizes and, depending on the diameter of the respective securing component, the teeth thereof would be bent into engagement with one or another of the various bulges, depressions, and the like. Also, it is possible to provide more than one securing component for the male or female section, or to provide a single one of the securing components with two or more rows of teeth which may be concentric with one another and whose teeth may be staggered with respect to the teeth of adjacent rows, if desired.

One of the particular advantages of the present invention lies in the fact that no relative movement of the male or female component and the securing component is possible, and that the openings which are formed by penetration of the teeth of the securing component are relatively small so that the material is not as susceptible to the formation of tears as is the case with larger openings. Naturally, the teeth need not all be arranged circumferentially and in similar manner, but can be provided at angles to one another to further guard against the formation of tears in case of excessive stress from any one direction.

It has been pointed out that the projecting tips of the teeth are bent either radially inwardly or radially outwardly. This is, however, merely a preferred arrangement and it is also possible, for instance, to bend the tips alternately radially inwardly and radially outwardly. Also, it has been stated that the main male and female components through which the teeth penetrate, are to be made of plastic material. Again, this is merely a preferred embodiment and any material which is penetrable by the teeth would be suitable. Also, the securing component need not necessarily be an annulus, although this has been found to be advantageous in practice; nevertheless, it can be of different configuration, for example plate-shaped.

It will be understood that each of the elements described above, or two or more together, may also find a useful application in other types of couplings differing from the types described above.

What is claimed as new and desired to be secured by Letters Patent is:

1. A coupling, particularly for connecting cooperating male and female sections of a snap fastener to a textile or like carrier, comprising an annular first component having a central aperture and a plurality of relatively rigid projections extending from one side of said component along the edge of said aperture; and a second component made at least partially from a material penetrable by said projections and having one side and another side, said first component being located at said one side of said second component to sandwich said textile or like carrier therebetween, and at least a portion of each of said relatively rigid projections extending through said textile or like carrier and through the penetrable material of said second component and beyond said other side thereof, each such portion constituting an anchor preventing separation of said first and second components and at least one side of said second component being provided with at least one projecting portion of such a diameter as to be located adjacent to said relatively rigid projections when the latter extend through the penetrable material of said second component and of such an axial length as to compress said textile or like carrier into said central aperture.

2. A coupling as defined in claim 1, wherein those portions of said relatively rigid projections which extend beyond said second component extend at an angle to the major extension of the respective projection and in contact with the material of said second component.

3. A coupling as defined in claim 2, wherein said portion of said relatively rigid projections have tapered free ends and wherein said free ends are at least partially embedded in said material of said second component.

4. A coupling as defined in claim 1, said annular first component having a predetermined thickness in axial direction, and said projecting portion projecting from said one side by a distance substantially equal to said predetermined thickness.

5. A coupling as defined in claim 1, said projecting portion being an annular projection.

6. A coupling as defined in claim 5, and further comprising at least one additional annular projection provided on said other side of said second component with said portion of said relatively rigid projections being bent over said additional annular projection and extending radially thereof.

7. A coupling as defined in claim 6, said additional annular projection being provided with a plurality of closely spaced radial depressions, each of said portions of said relatively rigid projections being received in one of said radial depressions.

References Cited

UNITED STATES PATENTS

| 1,201,528 | 10/1916 | Taylor | 24—213 |
| 1,378,108 | 5/1921 | Hart et al. | 24—94 |
| 1,607,144 | 11/1926 | Anderson | 24—214 |
| 1,690,637 | 11/1928 | Johnson | 24—217 |
| 2,745,160 | 5/1956 | Jones | 24—217 |
| 2,851,756 | 9/1958 | Jones | 24—208 |
| 2,990,595 | 7/1961 | Van Buren | 24—208 |
| 3,169,292 | 2/1965 | Fenton | 24—213 |
| 3,243,858 | 4/1966 | Melanson | 24—208 |

FOREIGN PATENTS

| 468,544 | 4/1914 | France. |
| 809 | 1877 | Great Britain. |
| 6,104 | 1907 | Great Britain. |

DONALD A. GRIFFIN, Primary Examiner